United States Patent [19]

Hashimoto

[11] Patent Number: 5,245,444
[45] Date of Patent: Sep. 14, 1993

[54] IMAGE REPRODUCTION USING ERROR DIFFUSION OR DITHER MATRIX

[75] Inventor: Yasunori Hashimoto, Yokohama, Japan

[73] Assignee: Canon Kabushiki Kaisha, Tokyo, Japan

[21] Appl. No.: 673,122

[22] Filed: Mar. 20, 1991

[30] Foreign Application Priority Data

Mar. 26, 1990 [JP] Japan ................................. 2-73510

[51] Int. Cl.$^5$ ............................................. H04H 1/40
[52] U.S. Cl. .................. 358/445; 358/448; 358/462
[58] Field of Search ............... 358/445, 448, 456, 457, 358/458, 459, 429, 440, 441, 444, 443, 461, 80, 446, 447, 463, 462

[56] References Cited

U.S. PATENT DOCUMENTS

| | | | |
|---|---|---|---|
| 4,549,220 | 10/1985 | Suzuki | 358/457 |
| 4,700,236 | 10/1987 | Abe | 358/457 |
| 4,743,975 | 5/1988 | Ijuin | 358/467 |
| 4,768,082 | 8/1988 | Hiratsuka et al. | |
| 4,843,458 | 10/1988 | Ito | |
| 4,876,610 | 10/1988 | Ohsawa et al. | |
| 4,907,094 | 3/1990 | Mishima et al. | 358/404 |
| 4,969,052 | 11/1990 | Ishida et al. | |
| 4,975,786 | 12/1990 | Katayama et al. | |
| 5,031,050 | 7/1991 | Chan | 358/457 |
| 5,057,913 | 10/1991 | Nagata et al. | 358/80 |
| 5,077,615 | 10/1991 | Tsuji | 358/457 |
| 5,095,328 | 3/1992 | Mizoguchi | 358/80 |
| 5,107,332 | 4/1992 | Chan | 358/80 |

FOREIGN PATENT DOCUMENTS

286414 10/1988 European Pat. Off. .

*Primary Examiner*—Edward L. Coles, Sr.
*Attorney, Agent, or Firm*—Fitzpatrick, Cella, Harper & Scinto

[57] ABSTRACT

Multivalued data enters and is converted into binary (two-valued) data in accordance with plural types of binary-conversion methods. Among the plural types of data obtained by such binary conversion, one is adopted as the object of coding and is coded. The object of coding to be stored in a memory is decided based upon the quantity of coded data.

16 Claims, 7 Drawing Sheets

| 28 | 32 | 36 | 40 |
|----|----|----|----|
| 24 | 4  | 8  | 44 |
| 20 | 16 | 12 | 48 |
| 63 | 60 | 56 | 52 |

F I G. 4

| ∗ | 1 |
|---|---|
| 1 |   |

IMAGE REPRODUCTION USING ERROR DIFFUSION OR DITHER MATRIX

BACKGROUND OF THE INVENTION

1. Field of the Invention

This invention relates to an image processing apparatus such as a facsimile apparatus having at least two binary-conversion processing methods and the method thereof.

2. Description of the Related Art

Figure 1:
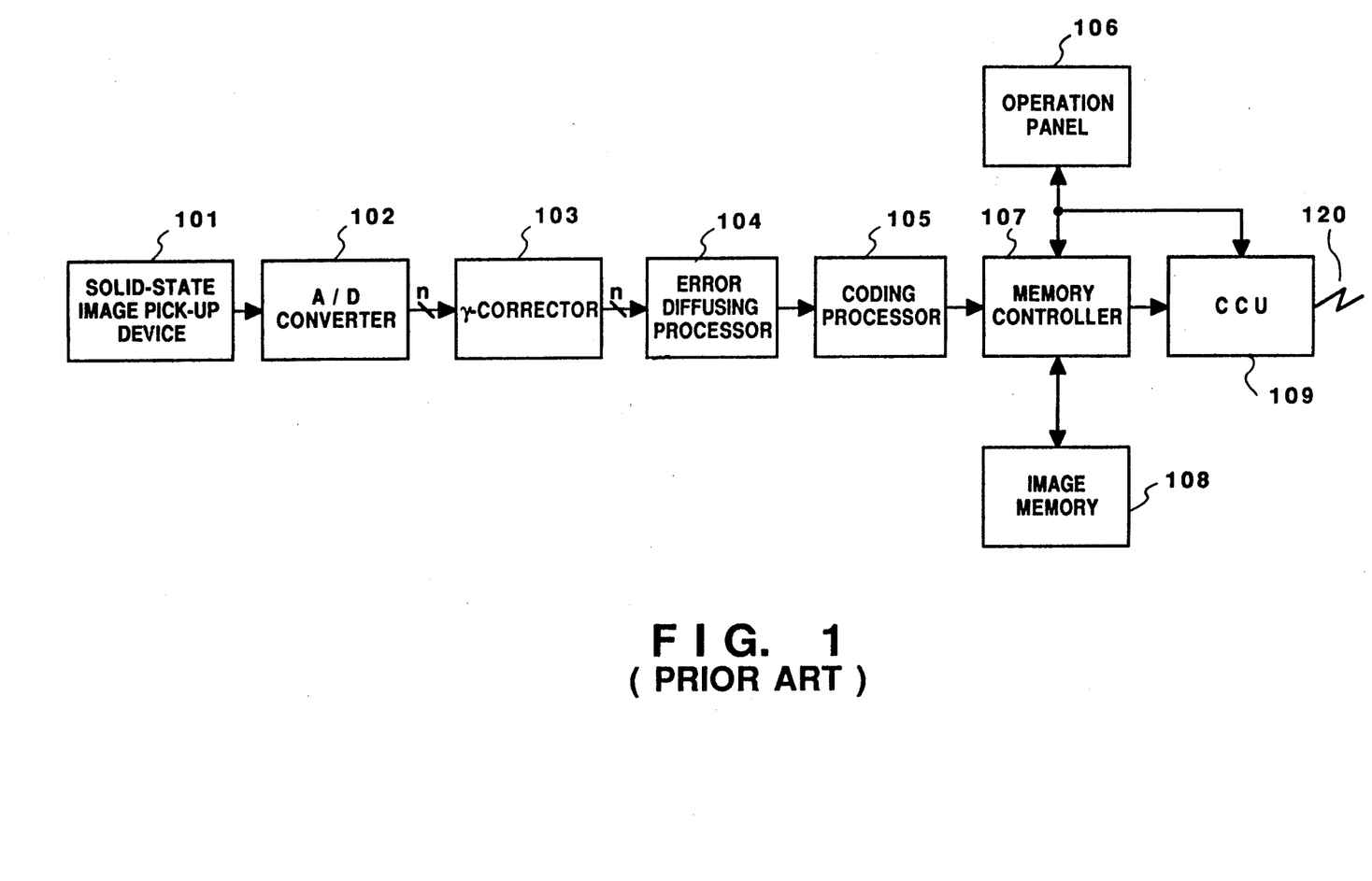
FIG. 1 is a block diagram illustrating the construction of a facsimile apparatus according to an example of the prior art.

FIG. 1 is a block diagram illustrating the construction of a facsimile apparatus according to an example of the prior art. The apparatus includes a solid-state image pick-up device 101 such as a CCD for reading an original and outputting an analog image signal indicative of the original, an A/D converter 102 for converting the analog image signal into a digital signal (in which each pixel is represented by n bits) and outputting the digital signal, a gamma ($\gamma$) correcting unit 103 for applying a $\gamma$ correction to the n-bit digital image signal, namely a multivalued image signal, an error diffusing processor 104 for diffusing, to peripheral pixels, an error which occurs when subjecting the n-bit multivalued image signal to binary-conversion processing and outputting an acceptable binary (two-valued) image signal (in which each pixel is represented by one bit), a coding processor 105 for coding the binary image signal as by a modified Huffman (MH), modified read (MR) or modified-modified read (MMR) facsimile coding method, namely a run-length coding method, an operation panel 106 comprising a display for displaying the status of the apparatus and a key input unit which the operator uses to enter instructions, a memory controller 107 controlling the writing or reading of image data relative to an image memory 108, which image memory 108 is for accumulating the image data, and a communication controller (CCU) 109 for transmitting and receiving data via a communication line 120.

In the arrangement described above, the analog image signal, which is obtained by scanning the original by means of the solid-state image pick-up device 101, is converted into n-bit digital data by the A/D converter 102. Next, the n-bit digital signal, namely the multivalued image signal, is acted upon by the $\gamma$ correcting unit 103 to convert the quantity of light into density, then the signal is subjected to error diffusing processing by the error diffusing processor 104, whereby the signal is converted into a one-bit binary image signal.

This binary image signal is coded by the coding processor 105 in accordance with the above-mentioned run-length coding method, and the signal is accumulated in the image memory 108 as coded data by the memory controller 107. When the operator uses the operation panel 106 to designate transmission at the end of the accumulating operation, the coded data accumulated in the image memory 108 is sent to the CCU 109 via the memory controller 107, and the CCU 109 sends the coded data to another party's apparatus through the communication line 120 in accordance with facsimile transmission procedure.

However, in the example of the prior art described above, the multivalued image signal is coded following the error diffusing processing, and the coded data is accumulated in the memory 108. As a consequence, the following problems arise:

When coding by the run-length coding method is applied to the binary image signal that has been subjected to error diffusing processing, the data compression ratio declines. This results in memory overflow in the image memory 108 and sometimes makes it impossible to transmit an original.

In order to accumulate the coded data in the image memory 108 reliably, the number of pages accumulated at one time is limited. Moreover, in a case where the number of pages accumulated is the maximum possible, communication time is prolonged and the cost of communication becomes quite high.

Furthermore, depending upon the kind of the binary-conversion processing method described above, there is a case in which the pixels of the output image may either concentrate or scatter. And in an ordinary image printing apparatus, the pixels are enlarged somewhat so that mutually adjacent pixels are caused to overlap before the image is printed out. As a consequence, a difference in density occurs.

SUMMARY OF THE INVENTION

An object of the present invention is to provide an image processing apparatus which solves the aforementioned problems encountered in the prior art.

Another object of the present invention is to provide an image processing apparatus in which the data compression ratio is improved, the probability of a transmission failure is reduced, and transmission is performed with reliability.

Still another object of the present invention is to provide an image processing apparatus in which binary-conversion processing capable of curtailing communication time is achieved and communication cost is capable of being reduced.

A further object of the present invention is to provide an image processing apparatus in which data can be accumulated in a memory more efficiently by performing binary conversion in accordance with at least two binary-conversion processing methods.

Yet another object of the present invention is to provide an image processing apparatus in which a difference in density at output can be reduced by performing a $\gamma$ correction corresponding to the binary-conversion processing method.

According to the present invention, there is provided an image processing apparatus comprising input means for inputting multivalued data, binary converting means for binary-converting the multivalued data, which has been input by the input means, in accordance with plural types of binary-conversion methods, coding means for coding, as an object of coding, one of plural types of data obtained by binary conversion performed by the respective binary converting means, and deciding means for deciding the object of coding stored in the memory based upon the quantity of data coded by the coding means.

According to another aspect of the present invention, there is provided an image processing apparatus comprising input means for inputting multivalued data, correcting means for correcting the multivalued data, which has been input by the input means, in accordance with plural types of $\gamma$ correction methods, binary converting means for binary-converting plural types of data, which have been corrected by said correcting means, in accordance with plural types of binary-conversion methods having one-to-one correspondence with the plural types of $\gamma$ correction methods, coding means for coding, as an object of coding, one of plural types of data obtained by binary conversion performed by the respective binary converting means, and deciding means for deciding the object of coding stored in the memory based upon the quantity of data coded by the coding means.

According to another aspect of the present invention, there is provided an image processing apparatus comprising input means for inputting an image data, first converting means for converting the image data input by said input means on the basis of a first conversion characteristic, second converting means for converting the image data input by said input means on the basis of a second conversion characteristic, and process means for quantization-processing the image data converted by said first converting means or said second converting means in accordance with one of different quantization methods.

According to another aspect of the present invention, there is provided an image processing method comprising the steps of inputting an image data, converting the input image data on the basis of a first conversion characteristic, converting the input image data on the basis of a second conversion characteristic, and quantization-processing the image data converted in the first step or said second converting step in accordance with one of different quantization methods.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

First Embodiment

Figure 2:
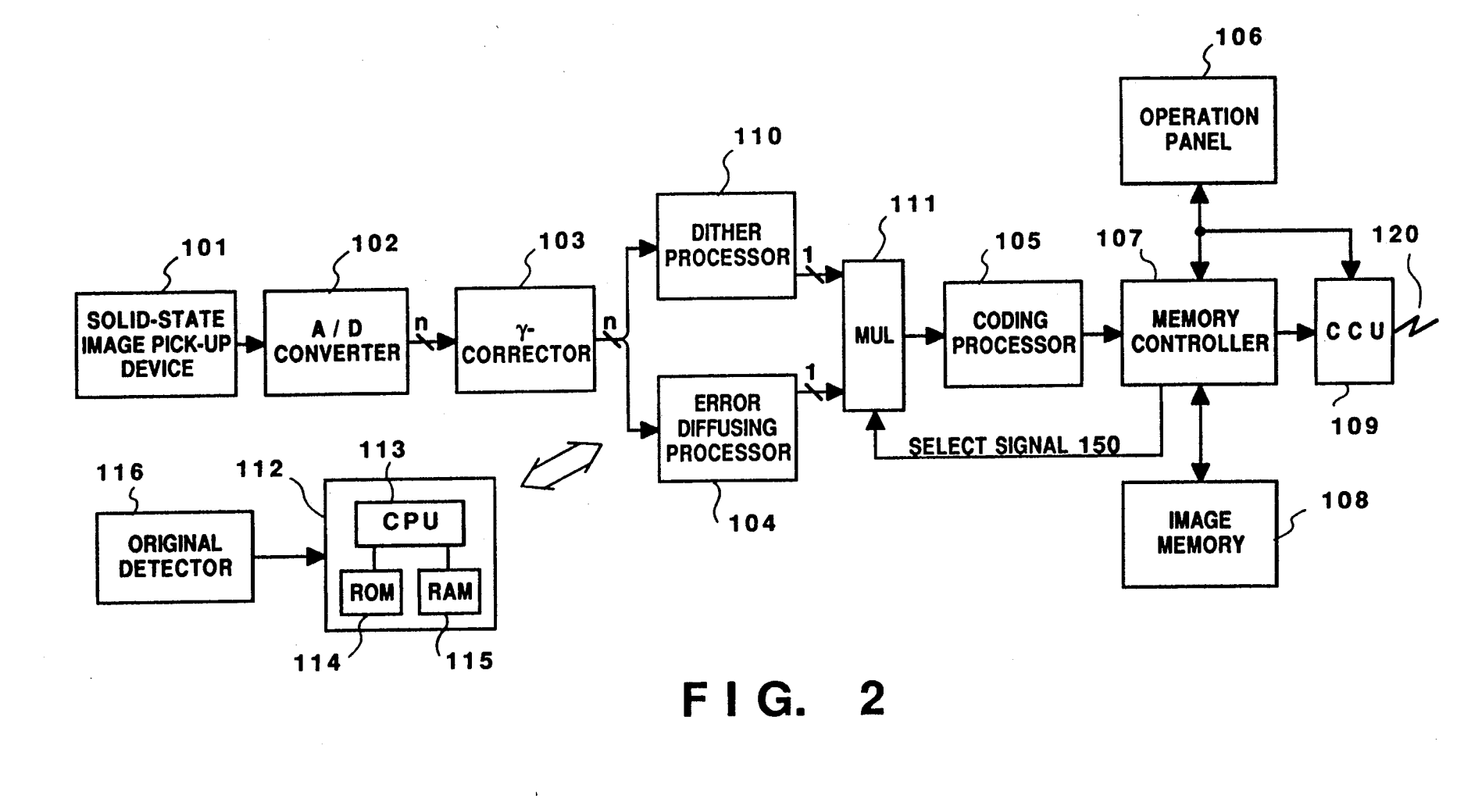
FIG. 2 is a block diagram illustrating the construction of a facsimile apparatus according to a first embodiment of the present invention.

FIG. 2 is a block diagram illustrating the construction of a facsimile apparatus according to a first embodiment of the present invention.

As shown in FIG. 2, the facsimile apparatus according to this embodiment includes the solid-state image pick-up element 101 such as a CCD, the A/D converter 102, the gamma ($\gamma$) correcting unit 103, the error diffusing processor 104, the coding processor 105, the operation panel 106, the memory controller 107, the image memory 108, the CCU 109, a dither processor 110, a multiplexer (MUL) 111, and a controller 112. The controller 112 includes a CPU 113 for performing overall control of the facsimile apparatus in accordance with a program, a ROM 114 which stores a program, illustrated by the flowchart of FIG. 6, for operating the CPU 113, and a RAM 115 used as a work area for executing various programs. Numeral 116 denotes an original detector for detecting whether an original has been set in a scanning portion in either a fixed mode, in which an original is placed upon a platen and an image reading operation is performed, or an automatic document feeder (ADF) mode, in which more than one original is placed in a feeder and images are read in successive fashion.

Figure 3:
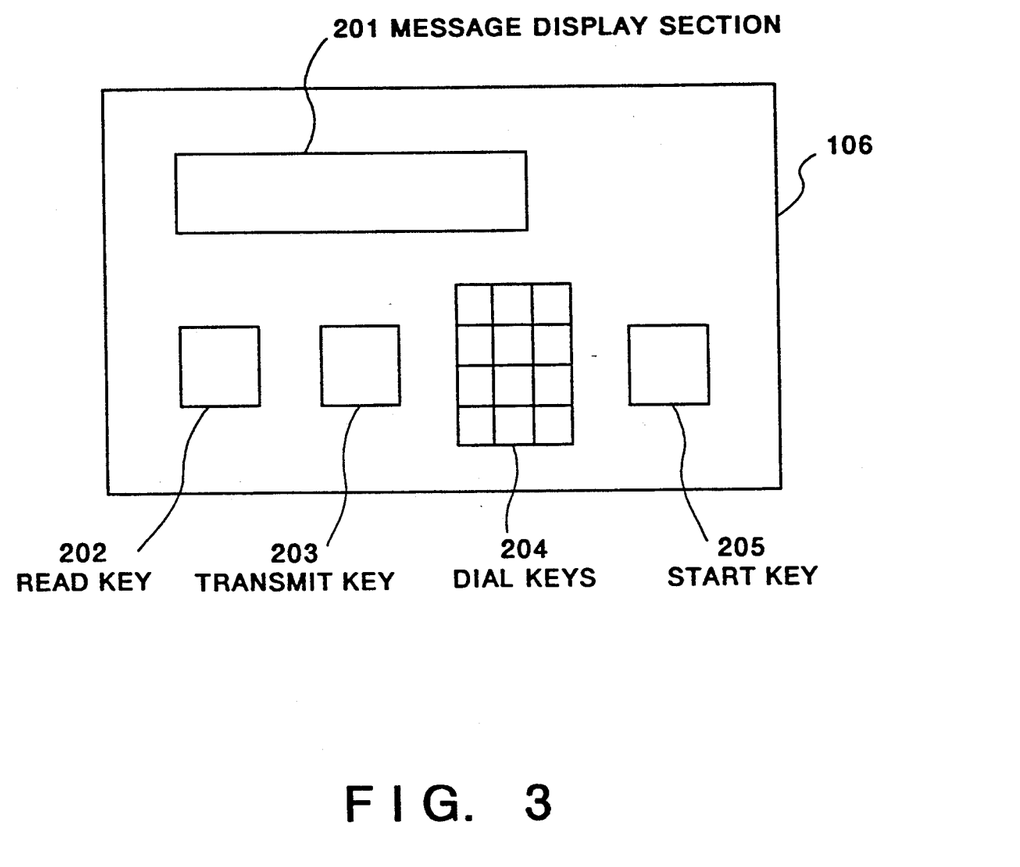
FIG. 3 is a diagram illustrating the details of an operation panel according to the first embodiment.

FIG. 3 is a diagram illustrating the details of a panel face on the operation panel 106. As shown in FIG. 3, the panel includes a message display section for displaying messages, a read key 202 for designating reading of an image, a transmit key 203 for entering a dial-input procedure, dial keys 204 for entering a telephone number, and a start key 205 for starting transmission.

The flow of data in the facsimile apparatus thus constructed and the processing executed by the various components will now be described.

The analog image signal, which is obtained by scanning the original by means of the solid-state image pick-up element 101, is converted into an n-bit digital signal by the A/D converter 102. Next, the n-bit digital signal, namely the multivalued image signal, is $\gamma$-converted by the correcting unit 103, and the resulting signal is output to the dither processor 110 or the error diffusing processor 104, whereby the signal is subjected to binary conversion to be converted into a one-bit binary image signal.

The method of dither processing will now be described.

Figure 4:
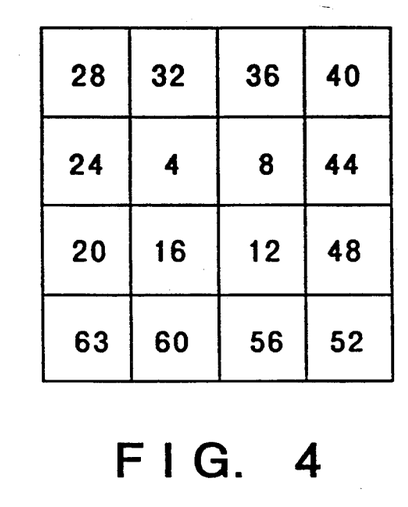
FIG. 4 is a diagram illustrating an example of a matrix for dither processing.

FIG. 4 is a diagram illustrating one example of a dither matrix for dither processing.

By way of example, it is assumed that the image data output by the A/D converter 102 is composed of six bits (n=6), and that values are extracted over a level range of 0 (white)–63 (black).

The six-bit multivalued image signal input to the dither processor 110, where it is successively compared with threshold values of the 4×4 dither matrix shown in FIG. 4. If the result of the comparison is that the signal is equal to or greater than a threshold value of the dither matrix, it is digitized as a black pixel and the value thereof is 63. If the signal is less than a threshold value of the 4×4 dither matrix, it is digitized as a white pixel and the value thereof is 0.

The dither matrix FIG. 4 has a size of 4×4 and indicates a case where the array pattern of the threshold values is of the vortex type. However, the size of the matrix and the array pattern of the threshold values are not limited to those of FIG. 4, and any pattern may be employed.

The error diffusion processing performed by the error diffusing processor 104 will now be described.

Figure 5:
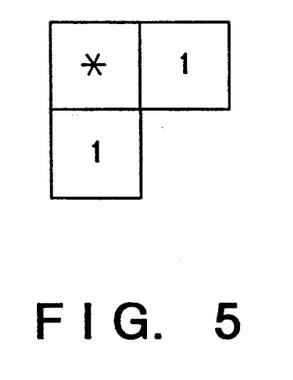
FIG. 5 is a diagram illustrating an example of a matrix for error diffusing processing.

FIG. 5 is a diagram showing an example of an error diffusion matrix which illustrates the diffused destination of an error exhibited by a pixel of interest. The numerals in this matrix indicate weighting assigned to peripheral pixels at the time of error diffusion. The asterisk "*" indicates the position of the pixel of interest.

In the error diffusing processor 104, the multivalued image signal which has entered is compared with a prescribed threshold value. If the signal is equal to or greater than the threshold value, the data is treated as being black. If the signal is less than the threshold value, the data is treated as being white. Thus, the signal is converted into a two-value or binary signal. The error in the pixel of interest, which error arises in this binary-conversion process, is diffused in accordance with the error diffusion matrix of FIG. 5. Specifically, one-half of the error is allotted to the neighboring pixel on the right side, and the remaining half of the error is allotted to the neighboring pixel on the lower side.

When the next pixel is processed, binary conversion is performed in the same manner upon first adding this allotted error to the input multivalued image signal. Thus, the error diffusing processor 104 repeatedly allots the successively generated errors to succeeding pixels to perform binary conversion.

For example, in a case where the threshold value is 32 and the multivalued image signal inputted first is 45 (the input value), this input multivalued image signal is binary-converted as black and a value of 63 (output value) is obtained. The error produced at this time is: (input value)−(output value)=45−63=−18. Accordingly, the error (−18) produced is diffused in accordance with the matrix of FIG. 5. That is, "−9" is allotted to the neighboring pixel on the right, and "−9" is allotted to the neighboring pixel below the pixel of interest. If the multivalued image signal input next is 30, then the aforesaid error "−9" is added to this signal to give 30−9=21, the allotment of the error is completed, and then the above-described binary conversion and error diffusion are carried out with "21" serving as the level of the pixel of interest, i.e., the input value. With regard to pixels from the second onward, the value of the multivalued image signal to which the error has been allotted is adopted as the input value.

Though the foregoing description has been rendered with regard to the error diffusion matrix shown in FIG. 5, there is no limitation upon the matrix used. In other words, error diffusion processing can be executed in accordance with any matrix.

With reference again to FIG. 2, the MUL 111 selects the binary image signal output by either the dither processor 110 or error diffusing processing 104, in accordance with a command from the memory controller 107. The selected binary image signal is coded in the coding processor 105 by the MH, MR or MMR run-length coding method, as described earlier, and the resulting signal is accumulated in the image memory 108 via the memory controller 107. In response to an instruction entered from the operation panel 106, the memory controller 107 causes the image data output by the coding processor 105 to be accumulated in the image memory 108, or causes the image data accumulated in the image memory 108 to be outputted to the CCU 109. Further, the memory controller 108 outputs a selection signal 150, which is for selecting the binary image signal, to the MUL 111. Here the selection signal 150 is assumed to be a one-bit signal.

In general, the error diffusion method is characterized by a high resolution and a low coding compression ratio, whereas the dither method is characterized by a low resolution and a high coding compression ratio. In this embodiment, greater importance is attached to resolution than to the coding compression ratio.

Accordingly, the selection signal 150 usually selects error diffusion processing. Then, if the image memory 108 overflows when the image data is accumulated, the selection signal 150 selects the dither processor 110, which executes dither processing. In response to a command for changing over the selection, the MUL 111 selects the output of the dither processor 110. In order for the image to be read again at the same time that the selection signal 150 is changed over, the memory controller 107 instructs the controller 112 to read the image again.

In a case where the scanner is currently in the fixed mode when the image is being read again, the message display section 201 displays the message "RE-READING" and scanning is performed again to read the image. Alternatively, if the scanner is in the ADF mode, the message display section 201 displays the message "RESET ORIGINAL READ LAST AND THEN PRESS START KEY". This is message which requests that the operator retrieve the original scanned last from an original ejection tray (not shown), return the retrieved original to an original feed tray (not shown) and then press the start key. The original can thus be read again. In a case where the image memory 108 overflows in spite of the re-reading operation described above, the message display section 201 of the operation panel 109 displays an error to the effect that the image memory 108 has overflowed, and operation is terminated.

When the start key 205 is pressed, the CCU 109 accepts, via the memory controller 107, the coded data accumulated in the image memory 108, and transmits the data to the communication line 120 in accordance with the facsimile transmission procedure.

Figure 6:
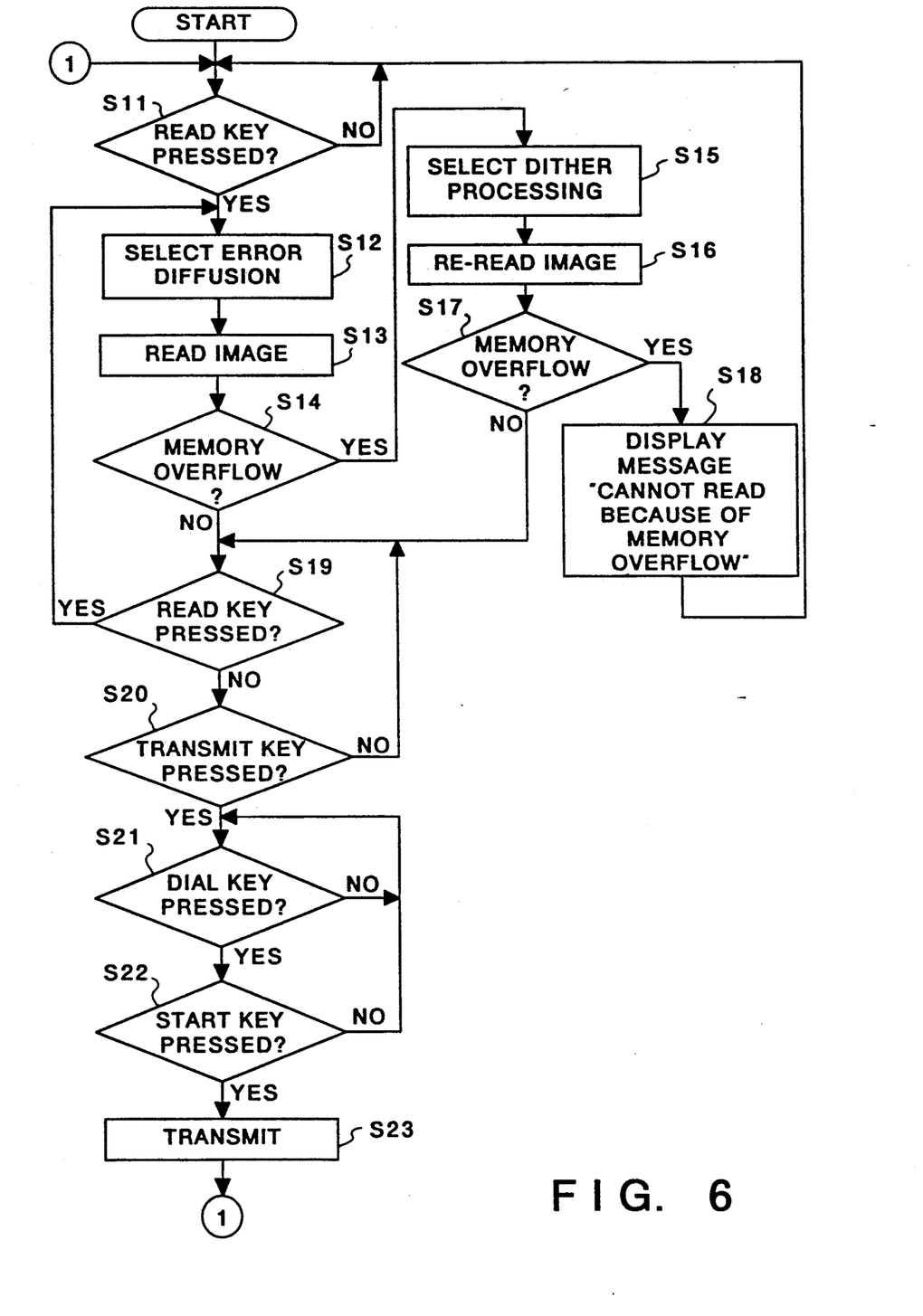
FIG. 6 is a flowchart for describing a processing procedure in the first embodiment.

The control procedure of this embodiment will now be described in accordance with the flowchart shown in FIG. 6. It should be noted that FIG. 6 illustrates the flow of a series of steps based not upon operations controlled completely by the CPU 113 but upon operations performed by the CPU 113 and each of the other components. It should also be noted that the flowchart of FIG. 6 represents only one example of a transmitting function according to the present invention.

First, at step S11 of the flowchart, the original is set upon an original reading section (not shown) of the apparatus and the system waits for the read key 202 to be pressed. When the key 202 is pressed, the program proceeds to step S12, where error diffusion processing is selected. Processing executed when a key other than the read key 202 is pressed is outside the scope of the invention and need not be described here. The set original is read at step S13.

The processing of step S13 is as follows: First, the original is read by the solid-state image pick-up device 101. When this has been accomplished, the resulting signal is converted into a six-bit digital signal, namely a multivalued image signal, by the A/D converter 102, and the multivalued image signal is γ-corrected by the γ correcting unit 103. The multivalued image signal thus corrected is converted into a two-valued signal by the error diffusing processor 104 in the manner described above, after which the resulting signal is coded by the coding processor 105. The coded signal is accumulated in the image memory 108 via the memory controller 107.

Next, at step S14, it is determined whether the image memory 108 has overflowed at accumulation of the image data in the image memory 108. If overflow is not detected, then the program proceeds to step S19. If overflow of the image memory 108 is detected, however, the program proceeds to step S15, where the MUL 11, under the control of the memory controller 107, selects the dither processor 110. The same original is read again at step S16 in conformity with each mode. This is followed by step S17, at which it is determined whether the image memory 108 has overflowed owing to the above-described re-reading processing. If the decision rendered is that the memory has not overflowed, then the program proceeds to step S19. On the other hand, if overflow of the memory is detected even at re-reading, the transmitting function is terminated. To this end, the program proceeds from step S17 to step S18, where the message "CANNOT BE READ BECAUSE OF MEMORY OVERFLOW" is displayed on the message display section 201, after which the program returns to step S11 to restore the system to the state in which is awaits a key input.

If overflow is not detected at step S17, then the program proceeds to step S19, where it is determined, based upon depression of the read key 202, whether the next original is to be read. If the read key 202 has been pressed, the program returns to step S12, where read processing is resumed. If the read key 202 has not been pressed, then it is determined at step S20 whether the transmit key 203 has been pressed. When the transmit key 203 has been pressed, the program proceeds to step S21, where the system waits for depression of the dial keys 204, which are for specifying the destination of the transmission. When the dial keys 204 are subsequently pressed to specify the destination of the transmission, the program proceeds to step S22, where the system waits for depression of the start key 205 to designate the start of transmission.

When the start key 205 has been pressed, the program proceeds to step S23, at which transmission of the coded data accumulated in the image memory 108 is started. At the end of transmission, the program returns to step S11, where the system waits for depression of the read key 202.

In the embodiment described above, the binary-conversion processing is changed depending upon whether the image memory 108 overflows when the image of the original is read. However, an arrangement can be adopted in which a usable memory area having a capacity of one page is decided beforehand. Then, the binary-conversion processing can be changed, even if the image memory 108 does not overflow, depending upon whether this memory area has accommodated the coded data.

Thus, in order to convert an inputted multivalued image signal into a two-valued image signal, at least two types of binary-conversion processing are used. Of the binary image signals obtained by these two types of processing, one is selected based upon the effectiveness of the resolution or data compression rate. This makes it possible to code the selected binary image signal and to accumulate the signal effectively. As a result, the probability of transmission is improved and so is the efficiency of accumulation in the image memory 108.

In other words, the possibility of a successful transmission is improved by making it possible to select either error diffusion processing or dither processing in dependence upon the amount of storage area remaining in the image memory 108.

According to the first embodiment described above, two types of binary-conversion processors are provided, namely the dither processor 11 and the error diffusing processor 104. However, the invention is not limited to this embodiment. An example of a modification would be to provide three or more binary-conversion processors, and the number of bits in the select signal 150 can be increased or decreased depending upon the type of processing. In addition, the changeover can be made in stages in dependence upon a predetermined priority. A density preservation method used in printers can be mentioned as one example of another type of binary-conversion processing.

Further, in the first embodiment described above, the changeover between the dither processor 110 and the error diffusing processor 104 is performed in response to detection of memory overflow. However, this does not pose a limitation upon the present invention. A modification would be to provide the operation panel 106 with a changeover key for changing over the binary-conversion processor or a selection key for selecting the binary-conversion processor, in which case the binary-conversion processor would be decided compulsorily.

Second Embodiment

A problem is encountered in the first embodiment since the same $\gamma$ correction is applied to both the dither processor and the error diffusing processor.

Specifically, the pixels of the output image tend to concentrate in the case of dither processing and to diffuse in the case of error diffusion processing. Furthermore, in the usual image printing apparatus, output pixels are enlarged somewhat so that mutually adjacent pixels overlap. As a result, there is a difference in density between the output image of the type employing dither processing and the output image of the type employing error diffusion processing.

Accordingly, the second embodiment of the present invention will be described taking as an example a case in which processing is executed upon applying different $\gamma$ corrections, one for dither processing and the other for error diffusing processing.

Figure 7:
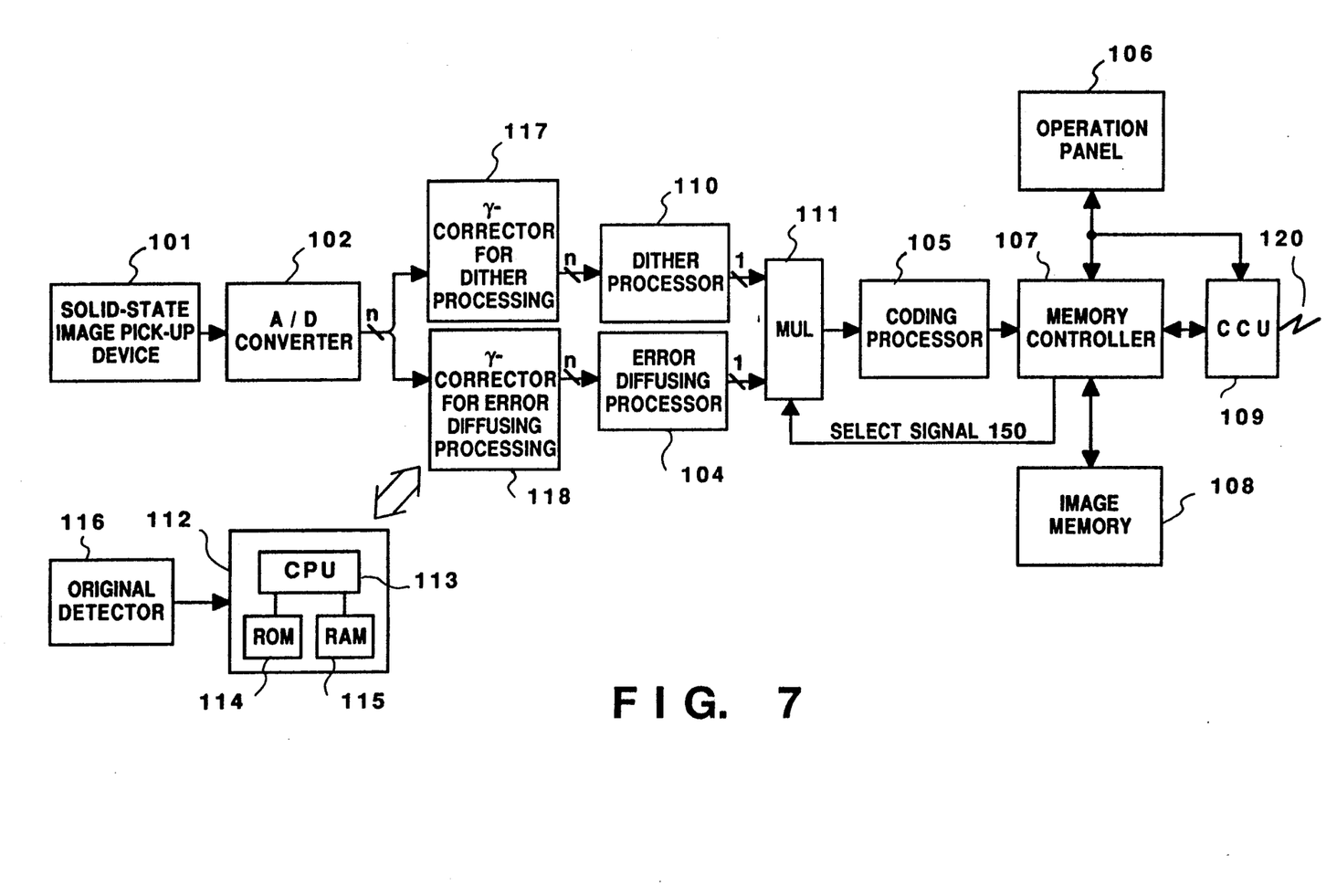
FIG. 7 is a block diagram illustrating the construction of a facsimile apparatus according to a second embodiment of the present invention.

FIG. 7 is a block diagram illustrating the construction of a facsimile apparatus according to a second embodiment of the present invention. Components already describing in connection with FIG. 2 are designated by like reference characters and need not be described again.

In FIG. 7, numeral 117 denotes a $\gamma$-corrector for dither processing, and numeral 118 represents a $\gamma$-corrector for error diffusing processing.

Figure 8:
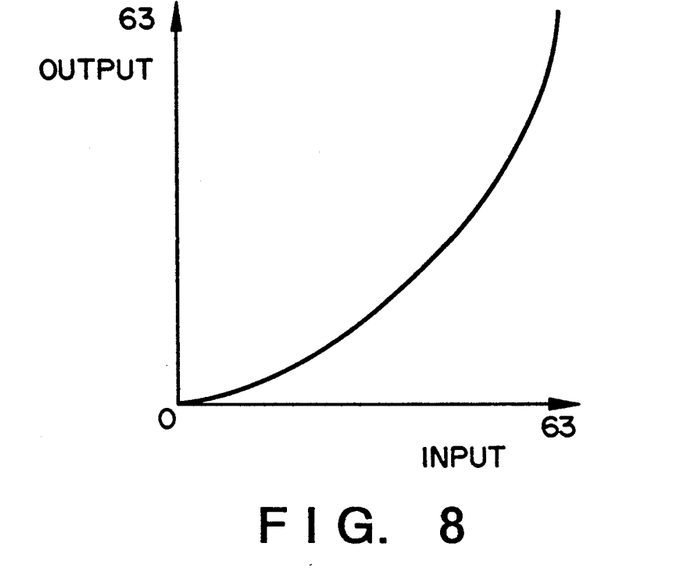
FIG. 8 is a diagram illustrating the $\gamma$ characteristic of a $\gamma$ correcting unit for dither processing.

FIG. 8 is a graph illustrating the characteristic of a $\gamma$ correction performed by the $\gamma$-corrector 112 for dither processing. This correction is processing mainly for effecting a conversion from light quantity to density. The data following the conversion is output as a six-bit multivalued image signal having a range of "0"–"63".

Figure 9:
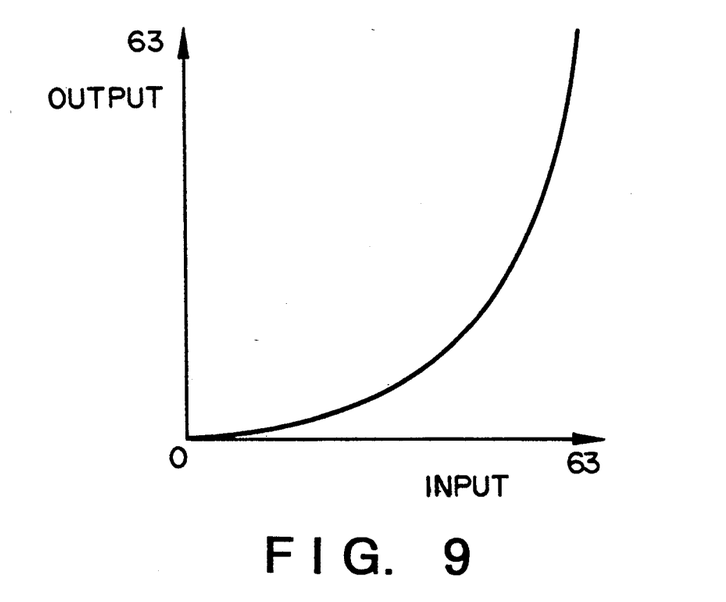
FIG. 9 is a diagram illustrating the $\gamma$ characteristic of a $\gamma$ correcting unit for error diffusing processing.

FIG. 9 is a graph illustrating the characteristic of a $\gamma$ correction performed by the $\gamma$-corrector 113 for error diffusing processing. In comparison with the graph of FIG. 8, this graph has a lower output level overall.

Thus, in accordance with the second embodiment, as described above, a $\gamma$ characteristic for dither processing and a $\gamma$ characteristic for error diffusing processing are provided, and a $\gamma$ correction conforming to the selection made by the memory controller 107 is performed. This makes it possible to reduce the difference in density between dither processing and error diffusing processing at the time of output.

In this embodiment also, it goes without saying that the modifications described in connection with the first embodiment can be applied.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting image data;
   first converting means for converting the image data input by said input means on the basis of a first conversion characteristic;
   second converting means for converting the image data input by said input means on the basis of a second conversion characteristic;
   first binarization means for binarizing the data converted by said first converting means in accordance with a first binarization scheme; and
   second binarization means for binarizing the data converted by said second converting means in accordance with a second binarization scheme which is different from the first binarization scheme, wherein the first and second conversion characteristics are specified in a manner such that the density of the output image data formed from the binary data binarized by said first binarization means based on input image data is approximately equal to that by said second binarization means based on the input image data.

2. The image processing apparatus according to claim 1, wherein said first binarization means binary-processes the image data converted by said first converting means in accordance with a dither method.

3. The image processing apparatus according to claim 1, wherein said second binarization means binary-processes the image data converted by said second converting means in accordance with an error diffusion method.

4. The image processing apparatus according to claim 1,
   wherein said input means includes generating means for generating light-quantity data given by reading an original and each of said first converting means and said second converting means converts the light-quantity data into density data.

5. The image processing apparatus according to claim 1,
   further comprising coding means for coding the image data quantization-processed by said quantization-processing means; and
   sending means for sending the image data coded by said coding means.

6. An image processing method comprising the steps of:
   inputting image data;
   a first converting step, of converting the image data input in said input step on the basis of a first conversion characteristic;
   a second converting step, of converting the image data input in said input step on the basis of a second conversion characteristic;
   a first binarization step, of binarizing the data converted in said first converging step, in accordance with a first binarization method; and
   a second binarization step, of binarizing the data converted in said second converting step, in accordance with a second binarization method, wherein the first and second conversion characteristics are specified in a manner such that the density of the output image data formed from the binary data binarized in said first converting step based on input image data is approximately equal to that in said second converting step based on the input image data.

7. The image processing method according to claim 6, wherein said first binarization step, the image data converted in said first converting step is binary-processed in accordance with a dither method.

8. The image processing method according to claim 7, wherein, in said second binarization step, the image data converted in said second converting step is binary-processed in accordance with an error diffusion method.

9. The image processing method according to claim 6, wherein said input step includes the step of generating light-quantity data given by reading an original, and wherein, in said first converting step and said second converting step, the light-quantity data is converted into density data.

10. The image processing method according to claim 6, further comprising the steps of:
    coding the image data quantization-processed in said quantization-processing step; and
    sending the image data coded in said coding step.

11. An image processing apparatus comprising:
    input means for inputting multivalued data;
    first binary converting means for binary-converting the multivalued data input by said input means into binary data with low coding efficiency;
    second binary converting means for binary-converting the multivalued data input by said input means into binary data with high coding efficiency;
    coding means for coding the binary data from either said first binary converting means or said second binary converting means;
    memory means for storing the coded data provided by said coding means; and
    selecting means for selecting the binary data from either said first binary converting means or said second binary converting means in accordance with an amount of data stored in said memory means, wherein said coding means codes the binary data selected by said selecting means.

12. The apparatus according to claim 11, wherein said selecting means first selects the binary data from said first binary converting means, and said coding means codes the binary data from said first binary converting means.

13. The apparatus according to claim 11, wherein said selecting means includes detecting means for detecting an overflow condition of said memory means due to the coded data from said coding means, and selects the binary data from said second binary converting means when said detecting means detects the overflow.

14. The apparatus according to claim 11, wherein said first binary converting means converts the multivalued data into binary data in accordance with an error diffusion method.

15. The apparatus according to claim 11, wherein said second binary converting means converts the multivalued data into binary data in accordance with a dither method.

16. The apparatus according to claim 11, further comprising:
    first characteristic conversion means for converting the characteristics of the multivalued data input by said input means in accordance with a first conversion characteristic; and
    second characteristic conversion means for converting the characteristics of the multivalued data input by said input means in accordance with a second conversion characteristic which is different from the first conversion characteristic, wherein said first binary converting means converts the multivalued data, whose characteristic has been converted by said first characteristic conversion means, into binary data, and said second binary converting means converts the multivalued data, whose characteristic has been converted by said second characteristic conversion means, into binary data.

* * * * *

UNITED STATES PATENT AND TRADEMARK OFFICE
CERTIFICATE OF CORRECTION

PATENT NO. : 5,245,444
DATED : September 14, 1993
INVENTOR(S) : YASUNORI HASHIMOTO It is certified that error appears in the above-identified patent and that said Letters Patent is hereby corrected as shown below:

ON TITLE PAGE , Item

[56] References Cited, under U.S. PATENT DOCUMENTS:
    "4,843,458  10/1988  Ito" should read
    --4,843,458  6/1989  Ito--;
    4,876,610  10/1988  Ohsawa et al." should read
    --4,876,610  10/1989  Ohsawa et al.--; and
    5,077,615  10/1991  Tsuji" should read
    --5,077,615  12/1991  Tsuji--.

COLUMN 1

Line 21, "namely" should read --namely,--.
    Line 44, "namely" should read --namely,--.

COLUMN 7

Line 20, "is" should read --it--.

COLUMN 10

Line 12, "wherein" should read --wherein, in--.

Signed and Sealed this

Twentieth Day of December, 1994

Attest:

BRUCE LEHMAN

Attesting Officer    Commissioner of Patents and Trademarks